(12) United States Patent
Vinard et al.

(10) Patent No.: US 8,997,598 B2
(45) Date of Patent: Apr. 7, 2015

(54) CONTROL WHEEL FOR AERONAUTICS

(71) Applicant: Crouzet Automatismes, Valence (FR)

(72) Inventors: Thierry Vinard, Chabeuil (FR); David Astier, Saint Marcel les Valence (FR); Vincent Mangin, Chomerac (FR); Nicolas Palusinski, Saint Georges les Bains (FR)

(73) Assignee: Crouzet Automatismes, Valence (FR)

( * ) Notice: Subject to any disclaimer, the term of this patent is extended or adjusted under 35 U.S.C. 154(b) by 91 days.

(21) Appl. No.: 13/834,263

(22) Filed: Mar. 15, 2013

(65) Prior Publication Data

US 2013/0255436 A1     Oct. 3, 2013

(30) Foreign Application Priority Data

Mar. 29, 2012   (FR) ..................................... 12 00937

(51) Int. Cl.
    *B64C 13/04*      (2006.01)
    *G05G 1/10*      (2006.01)

(52) U.S. Cl.
    CPC . *G05G 1/10* (2013.01); *B64C 13/04* (2013.01)

(58) Field of Classification Search
    USPC ............. 74/484 R, 551.4, 552, 558; 244/221, 244/234; 200/61.54
    See application file for complete search history.

(56) References Cited

U.S. PATENT DOCUMENTS

| | | | |
|---|---|---|---|
| 1,093,441 A * | 4/1914 | Laurance | 74/552 |
| 2,461,997 A | 2/1949 | Obszarny et al. | |
| 2,641,629 A | 6/1953 | Bennett, Jr. et al. | |
| 6,509,552 B1 * | 1/2003 | Roske et al. | 219/497 |
| 2012/0006148 A1 | 1/2012 | Nagata | |

OTHER PUBLICATIONS

French Preliminary Search Report issued Dec. 11, 2012, in French 1200937, filed Mar. 29, 2012 (with English Translation of Categories of Cited Documents).
"Building a yoke, part 1", The Mile High Geek, XP002688159, http://milehighgeek.wordpress.com/2010/11/22/building-a-yoke-part-1/, Nov. 22, 2010, 5 pages.

* cited by examiner

*Primary Examiner* — Thomas Diaz
(74) *Attorney, Agent, or Firm* — Oblon, McClelland, Maier & Neustadt, L.L.P.

(57) ABSTRACT

The invention concerns a control wheel (100) for aeronautics constituted of at least two half-shells (10) assembled one to the other, said half-shells comprising reinforcing ribs (11) on their internal surface, positioning and fixing means (12) and locating holes (13) to allow the passage of electrical wires connecting electrical actuating means (20) to a control unit. The control wheel (100) includes a central opening (15) intended to be connected to a control shaft/hub. The wheel comprises an intermediate guide part (50) disposed between the half-shells (10) and positioned inside the control wheel (100), said part including at least one guide conduit (51) adapted to connect on the one hand a locating hole (13) to the central opening (15) of the control wheel (100).

20 Claims, 3 Drawing Sheets

CONTROL WHEEL FOR AERONAUTICS

TECHNICAL FIELD OF THE INVENTION

The invention relates to a control wheel for aeronautics constituted of at least two half-shells assembled one to the other. Said half-shells comprise reinforcing ribs on their internal surface, positioning and fixing means and locating holes to allow the passage of electrical wires connecting electrical actuating means to a control unit. The control wheel includes a central opening intended to be connected to a control shaft/hub.

PRIOR ART

The use of molded parts in half-shell form is routine for the fabrication of control wheels intended for aeronautics. The wheels include at least two molded half-shells placed one against the other. The half-shells are notably produced in molded plastic. To obtain the required rigidities, the internal surfaces of the half-shells include reinforcing ribs. Said ribs are preferably disposed in the form of a rectangular grid.

After assembly of the half-shells, the shell of the control wheel is generally covered with a sheath. The control wheels are generally mounted on a control shaft. The control shaft is intended both to transmit mechanical commands and also electrical commands to the airframe. The mechanical commands are linked to the movements of the control wheel in space, movements imposed by the pilot. The electrical commands are linked to the actuation of actuating means such as electrical buttons or joysticks present on the control wheel.

The electrical actuating means are connected to a control unit by electrical wires in accordance with a routing inside the control wheel and the control shaft. The wires of the control wheel are wired in the traditional manner before closing the two half-shells.

Maintenance requirements in aeronautics require a systematic changing of the electrical wires after a certain period of use of the control wheels. In the present state of the art, this change necessitates complete demounting of the control wheel, demounting accompanied by the changing of the sheath. These maintenance operations have the disadvantage of being both technically complicated and also costly.

SUMMARY OF THE INVENTION

The invention therefore aims to remedy the drawbacks of the prior art so as to propose a control wheel adapted to be wired simply.

The control wheel in accordance with the invention comprises an intermediate guide part disposed between the half-shells and positioned inside the control wheel, said part including at least one guide conduit adapted to connect on the one hand a locating hole to the central opening of the control wheel.

The central opening is preferably positioned on one of the half-shells.

The intermediate guide part advantageously includes a plurality of guide conduits connecting a respective locating hole to the central opening of the wheel.

The intermediate guide part preferably includes a rear part and a front part.

The intermediate guide part is advantageously produced in molded plastic.

In one particular embodiment the rear and front parts of the intermediate guide part are integrated onto assembled half-shells after an overmolding operation.

The half-shells are advantageously produced in molded plastic.

BRIEF DESCRIPTION OF THE FIGURES

Other advantages and features will emerge more clearly from the following description of one particular embodiment of the invention, given by way of nonlimiting example and represented in the appended drawings, in which.

DETAILED DESCRIPTION OF ONE EMBODIMENT

Figure 1:
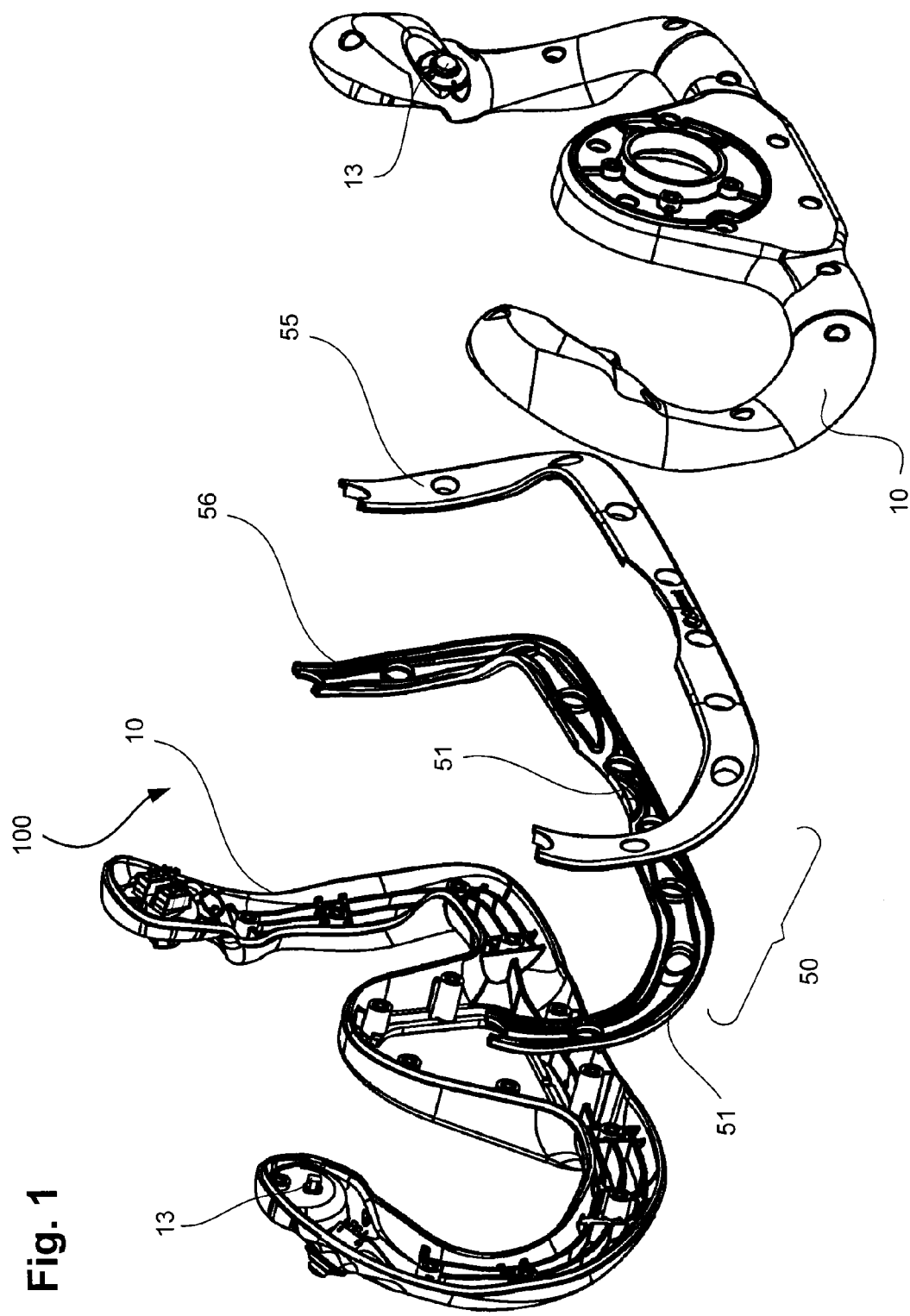
FIG. 1 represents an exploded general view from behind of a control wheel in accordance with one embodiment of the invention.

In one embodiment of the invention as shown in FIG. 1 the control wheel notably for aeronautics is constituted of at least two half-shells 10 assembled one to the other.

Said half-shells are preferably produced in molded plastic. Furthermore, they include an external face and an internal face. The external face is designed to be placed in contact with the hands of a user such as notably a pilot.

Figure 2:
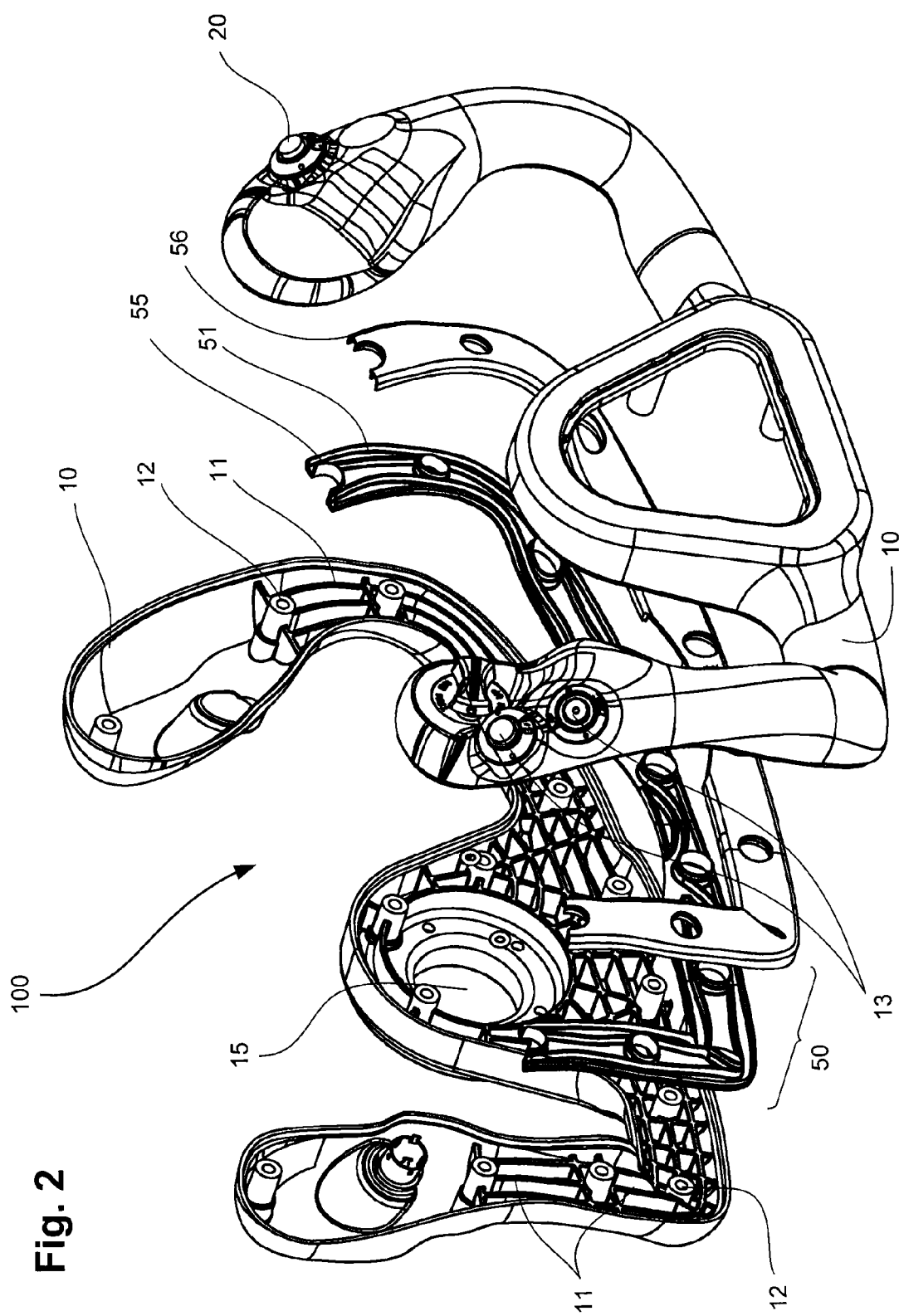
FIG. 2 shows an exploded general view of the front face of a control wheel according to FIG. 1.
Figure 3:
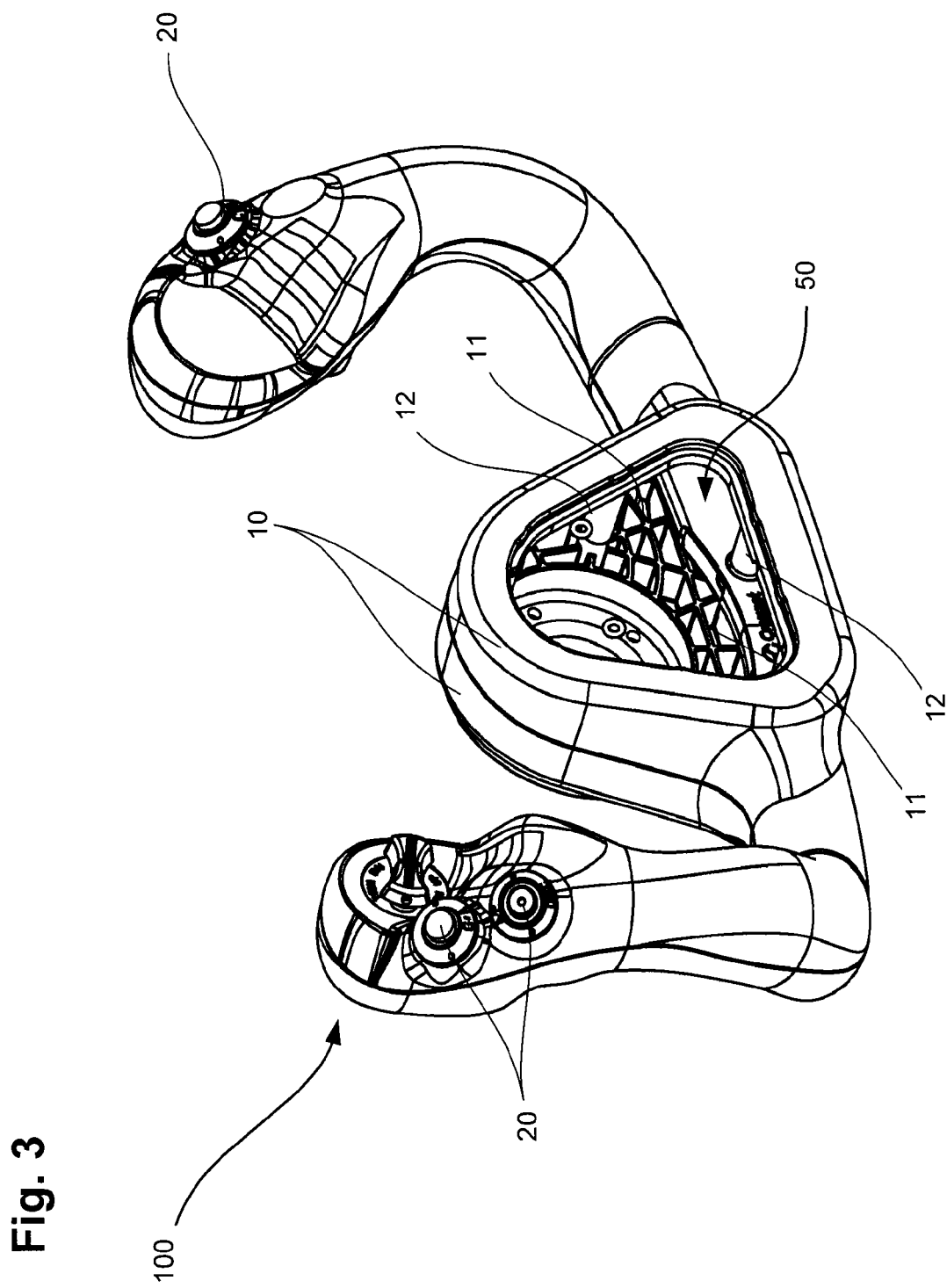
FIG. 3 represents a general view of the control wheel according to FIG. 1.

The internal face includes reinforcing ribs 11. The reinforcing ribs are arranged to impart some rigidity to the half-shells 10. The ribs are both disposed in the lengthwise direction of the half-shells 10 and also perpendicularly. As represented in FIGS. 1-3, positioning and fixing means 12 are arranged to facilitate the positioning and/or the fixing of a first half-shell with a second half-shell. By way of example the positioning and fixing means 12 are preferably centering studs disposed between the ribs. Said centering studs notably include screwthreads intended to collaborate with screws or other similar fixing means for holding the two half-shells assembled one to the other.

The wheel 100 includes a central opening 15 intended to be connected to a control shaft/hub (not shown) of transport means such as notably an airframe. One of the two half-shells 10 then includes a central opening intended for fixing said control wheel to a control shaft. Moreover, in addition to the mechanical fixing of the wheel, the central opening 15 allows the passage of control means such as control wires connecting actuating means 20 such as control buttons disposed on the control wheel 100. Thus the half-shells 10 also include holes 13 for positioning said actuating means 20. The holes 13 also allow the passage of electrical wires. The wires pass through the control wheel to connect the electrical actuating means to a control unit via the central opening.

In a preferred embodiment of the invention, the control wheel comprises an intermediate guide part disposed between the half-shells. The guide part is positioned inside the control wheel in a free volume provided for this purpose.

Said intermediate guide part 50 includes at least one guide conduit 51. The positioning of the intermediate guide part in the free volume of the wheel and the positioning of the guide conduit are effected so that a locating hole 13 of the wheel is joined to the central opening 15 of the wheel via the conduit 51.

In one particular embodiment as represented in FIG. 1, the intermediate guide part 50 includes a plurality of guide conduits 51. Each conduit 51 connects at least one of the locating holes 13 to the central opening 15 of the wheel 100.

By way of example, the intermediate guide part may be produced in molded plastic or machined from solid or forged or pressed.

In a development of the invention, the intermediate guide part 50 includes a rear part 55 and a front part 56. Said rear and front parts may be attached parts or parts molded over the half-shells 10 of the control wheel.

The solution as described enables some rapidity of mounting and demounting of the control wheel 100 for maintenance to be assured. Furthermore, thanks to the solution described, rewiring of the control wheel 100 no longer necessarily necessitates complete demounting of said wheel, demounting generally being accompanied by opening of the two half-shells 10. The electrical wires are then guided directly inside the guide conduits 51 of the intermediate part, guided directly from a locating hole 13 to the central opening 15 of the wheel 100. This wiring operation without demounting of the wheel 100 represents a very significant time saving during a maintenance cycle.

The invention claimed is:

1. A control wheel for aeronautics comprising:
   at least two half-shells assembled to each other, each of the at least two half-shells comprising:
   an external face and an internal face;
   reinforcing ribs on the internal face; and
   positioning and fixing means, wherein at least one of the at least two half-shells further includes locating holes to allow a passage of electrical wires connecting electrical actuating means to a control unit;
   a central opening that connects to a control shaft/hub; and
   an intermediate guide part disposed between the at least two half-shells and positioned inside the control wheel, said intermediate guide part forming at least one guide conduit, inside of which guides the electrical wires directly from the locating holes to the central opening of the control wheel, the at least one guide conduit having an end disposed adjacent to the locating holes and another end disposed adjacent to the central hole.

2. The control wheel as claimed in claim 1, wherein the central opening is positioned on one of the at least two half-shells.

3. The control wheel as claimed in claim 2, wherein the intermediate guide part includes a rear part and a front part.

4. The control wheel as claimed in claim 2, wherein the intermediate guide part is produced in molded plastic.

5. The control wheel as claimed in claim 2, wherein the at least two half-shells are produced in molded plastic.

6. The control wheel as claimed in claim 1 or 2, wherein the intermediate guide part includes a plurality of guide conduits that connect each of the locating holes to the central opening of the control wheel.

7. The control wheel as claimed in claim 6, wherein the intermediate guide part includes a rear part and a front part.

8. The control wheel as claimed in claim 6, wherein the intermediate guide part is produced in molded plastic.

9. The control wheel as claimed in claim 6, wherein the at least two half-shells are produced in molded plastic.

10. The control wheel as claimed in claim 1, wherein the intermediate guide part includes a rear part and a front part.

11. The control wheel as claimed in claim 10, wherein:
    the intermediate guide part is produced in molded plastic; and
    the rear part of the intermediate guide part and the front part of the intermediate guide part are integrated into the assembled at least two half-shells after an overmolding operation.

12. The control wheel as claimed in claim 10, wherein the intermediate guide part is produced in molded plastic.

13. The control wheel as claimed in claim 10, wherein the at least two half-shells are produced in molded plastic.

14. The control wheel as claimed in claim 11, wherein the at least two half-shells are produced in molded plastic.

15. The control wheel as claimed in claim 1, wherein the intermediate guide part is produced in molded plastic.

16. The control wheel as claimed in claim 15, wherein the at least two half-shells are produced in molded plastic.

17. The control wheel as claimed in claim 1, wherein the at least two half-shells are produced in molded plastic.

18. The control wheel as claimed in claim 1, wherein the electrical wires are disposed within the intermediate guide part.

19. The control wheel as claimed in claim 1, wherein:
    the locating holes extend from the external face to the internal face;
    the electrical actuating means is disposed on the external face;
    the electrical actuating means is connected to the control unit via the central opening; and
    the central opening allows the passage of the electrical wires to the control unit.

20. The control wheel as claimed in claim 1, wherein the intermediate guide part has a plurality of holes extending in a same direction as the central opening.

* * * * *